April 1, 1958  J. E. JAMESON  2,828,974
AUTOMATIC COUPLING DEVICES FOR VEHICLES
Filed Aug. 25, 1955  2 Sheets-Sheet 1

INVENTOR.
John E. Jameson
BY

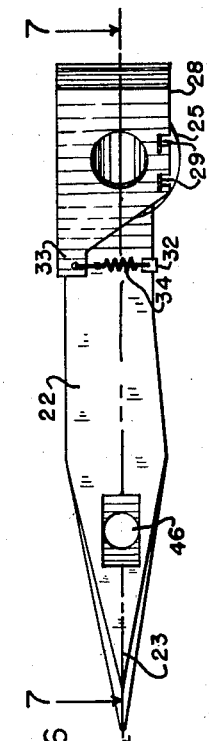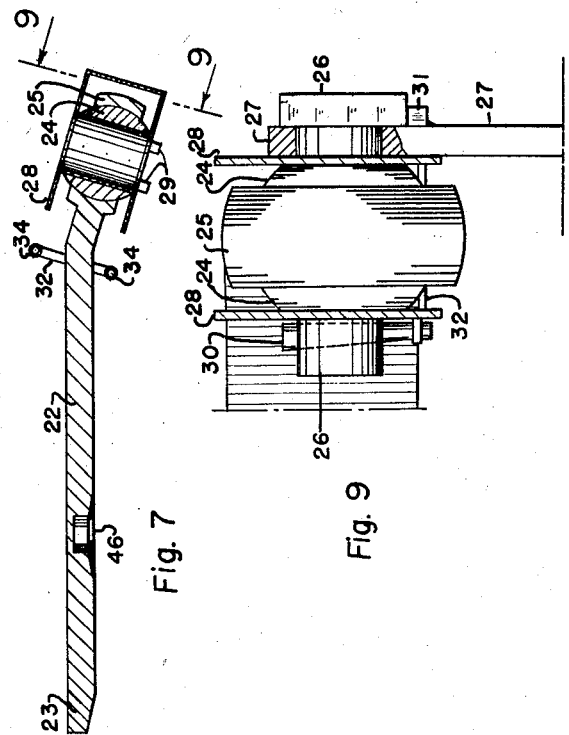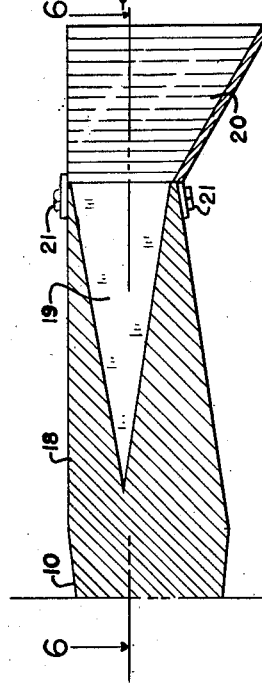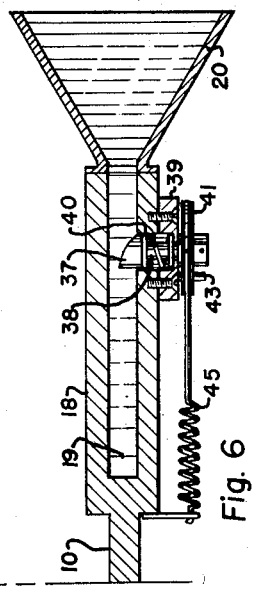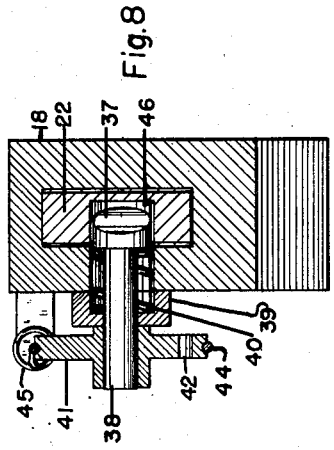

United States Patent Office 2,828,974
Patented Apr. 1, 1958

2,828,974

AUTOMATIC COUPLING DEVICES FOR VEHICLES

John E. Jameson, Fulton, Mo.

Application August 25, 1955, Serial No. 530,564

3 Claims. (Cl. 280—510)

This invention relates to an automatic coupling device for coupling two vehicles together. It is more particularly designed for coupling farm implements to a tractor.

The principal object of the invention is to provide a simple, highly efficient, automatic coupling device which will enable a tractor operator to back the tractor to an implement, and which will act to automatically couple the implement to the tractor by simple contact so that it will not be necessary for the operator to dismount when attaching various implements to the tractor.

Another object of the invention is to so construct the device that an implement can be disconnected from a tractor whenever desired without it being necessary for the operator to leave his driving position.

A further object is to provide improved draw bar links to replace the conventional draw bar links used in "Ferguson" or three-point tractor linkages which will automatically couple to coupling members applied to the implement to be towed.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 4 is a fragmentary, longitudinal section through the rear extremity of the improved draw bar link, taken on the line 4—4, Fig. 2, with the coupling member removed;

Fig. 5 is a side view of the improved implement coupling member removed from the draw bar link;

Fig. 6 is a horizontal section through the rear extremity of the improved draw bar link, taken on the line 6—6, Fig. 4;

Fig. 7 is a similar horizontal section through the improved coupling member, taken on the line 7—7, Fig. 5;

Fig. 8 is an enlarged cross-section, taken on the line 8—8, Fig. 2, through the rear extremity of the improved draw bar link, illustrating the coupling member in place therein; and Fig. 9 is a similarly enlarged cross-section, taken on the line 9—9, Fig. 7, illustrating a rear end view of the improved coupling member.

Figure 1:
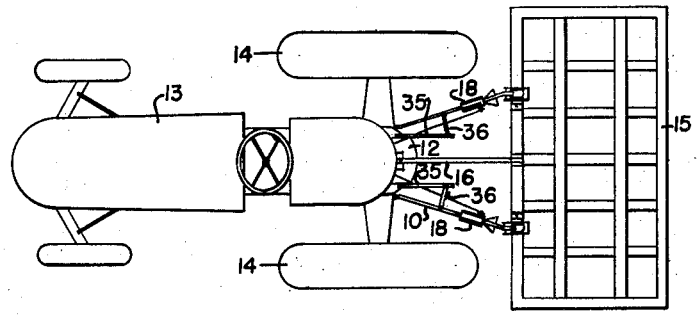
Fig. 1 is a diagrammatic plan view of a conventional tractor and farm implement, illustrating the invention applied thereto.
Figure 2:
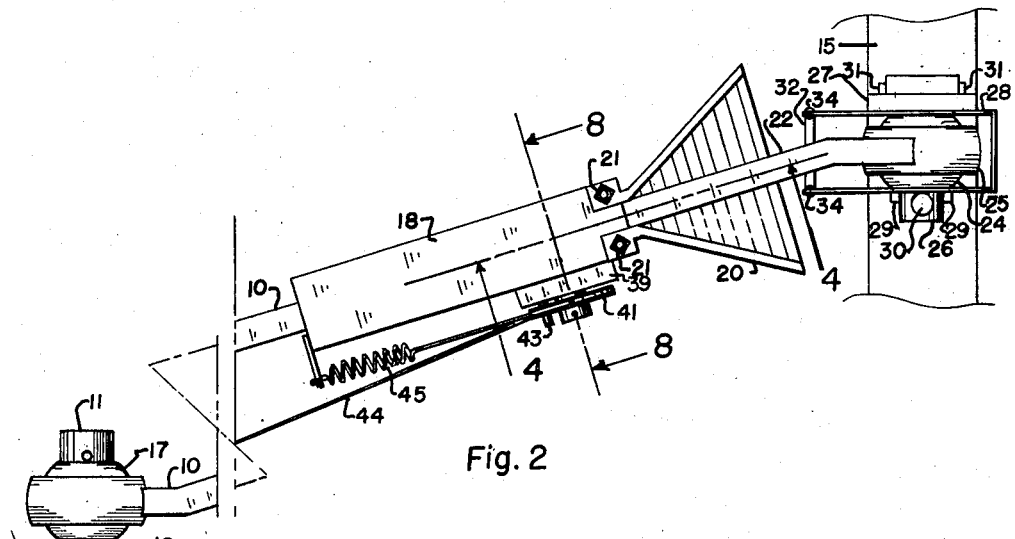
Fig. 2 is a fragmentary, enlarged, plan view of the improved draw bar link of the tractor and the improved coupling member of the implement in coupled relation.

In Fig. 1 a conventional tractor has been diagrammatically illustrated at 13 with its rear wheels at 14 and its transmission case at 12. A conventional agricultural implement frame has been diagrammatically indicated at 15. Tractors of this type are provided with what is known as the "Ferguson" or three-point linkage consisting of two lower draw bar links for attachment to a draw bar or to an implement, and with an upper compression link, such as illustrated at 16, for preventing relative tilt between the tractor and the implement. The draw bar links are conventionally supported from hydraulically-operated levers 35 by means of suspension links 36. The draw bar links are mounted on and extend rearwardly from mounting studs 11 projecting from the sides of the transmission case 12. This invention replaces the conventional lower draw bar links with an improved link 10 provided with means for automatically coupling the link to the implement 15.

The improved automatic coupling device comprises the improved draw bar link 10 designed to replace the usual draw bar links found on three-point hitch or "Ferguson" linkage tractors. The improved draw bar links 10 are provided at their forward extremities with rotatable bearing balls 17 drilled to receive the conventional mounting studs 11 on the crank case. The links are universally movable about the balls 17. The rear extremity of each draw bar link 10 is formed with an enlarged coupling receiving box 18 provided with an internal pointed cavity 19 which is open to the rear of the draw bar link.

Each draw bar link is provided with a flaring open-topped, coupler shield 20 which is secured to the rear extremity of the link 10 in any desired manner, such as by means of suitable attachment bolts 21, and inclines downwardly from the bottom of, and outwardly from the sides of, the open extremity of the cavity 19.

Each shield 20 and the adjacent cavity 19 are designed to receive a coupler member 22 provided with a relatively sharp, pointed forward etxremity 23. The rear extremity of each coupler member 22 and the forward extremity of each draw bar link 10 are angularly turned to lie in a plane parallel to the longitudinal axis of the tractor, while the major portion of the link 10 and the major portion of the coupler member 22 extend on the usual outwardly flared angle of the conventional draw bar link.

The rear extremity of each coupler member 22 is provided with a relatively large mounting ball 24 rotatably contained in a ball collar 25. The ball 24 is drilled to receive a conventional implement mounting pin 26 such as are used for mounting implements on conventional three-point mounted tractors. The pins 26 extend horizontally through angle clips 27 welded or otherwise formed on the implement 15. Each ball 24 and its collar 25 are surrounded on the two sides and the rear by means of a U-shaped enclosing housing 28.

The enclosing housing 28 is normally maintained in a horizontal position on the implement by means of outwardly bent ears 29 which engage the opposite sides of the usual locking pin 30 which is driven through the extremity of the mounting pin 26 to maintain the latter in place. The mounting pin 26 is ordinarily prevented from rotation by means of clips 31 which engage the opposite sides of the head of the pin.

The coupling member 22 is resiliently supported in a substantially horizontal position by means of a supporting saddle member 32 which is supported from projecting portions 33 on the housing 28 by means of suitable tension springs 34. The angle clips 27, the mounting pin 26 and the locking pin 30 are conventional equipment on implements designed to be towed by three-point linkages.

The implement 15 is provided with two of the coupling members 22 inclined inwardly toward each other, and the tractor is provided with two of the improved draw bar links 10 inclined outwardly from each other. It can now be seen that if the tractor is backed toward the stationary implement 15, the coupler shields 20 will move rearwardly to receive the pointed extremities 23 of the coupler members 22 so as to guide them into the internal pointed cavities 19 in the rear extremities of the draw bar links 10.

As before stated, the usual tractor draw bar links are suspended from the hydraulic levers 35 on the suspension links 36. The improved draw bar links 10 which replace the usual links are similarly suspended so that the operator can raise or lower the rear extremities of the draw bar links by operation of his hydraulic linkage to position the shields 20 horizontally ahead of the coupling members 22. The rear extremities of the links are free to swing sidewardly due to their swinging suspension and to the balls 17 so that they can move sidewardly in either direction as the coupling members 22 enter, to properly align them with the coupling members. This is also true of the coupling members for they are similarly free to move sidewardly a distance limited by the width of the housing 28 and about the axis of the ball 24 so that as they enter the shields they will be swung into accurate alignment with the cavities 19 and the draw bar links 10.

Thus, it can be seen that the tractor will be automatically aligned in coupling position with the implement by simply backing it toward the implement.

Means must be provided, of course, for locking the coupling members 22 in the cavities 19 of the boxes 18 for towing purposes. The means provided comprise a rotatable latch head 37 mounted in the side of each box 18 and provided with an inclined inner surface. Each latch head is formed on the inner extremity of a rotatable and longitudinally movable latch shaft 38. The latch shafts are journalled in side plates 39 secured to the sides of the boxes 18 and a compression spring 40 is compressed between each plate 39 and the adjacent head 37 to constantly urge the head into the cavity 19.

A sheave wheel 41 is mounted on the outer extremity of each latch shaft 38 and acts to limit the amount of insertion of the head 37 into the cavity 19. The sheave wheels are formed with concentric arcuate slots 42 into which stop pins 43, mounted in the plates 39, project. The pins 43 and their slots 42 allow the sheave wheels to rotate through arcs of 180°. Rotation is imparted to the sheave wheels through the medium of flexible cables 44 extending forwardly to the driver's position on the tractor.

Figure 3:
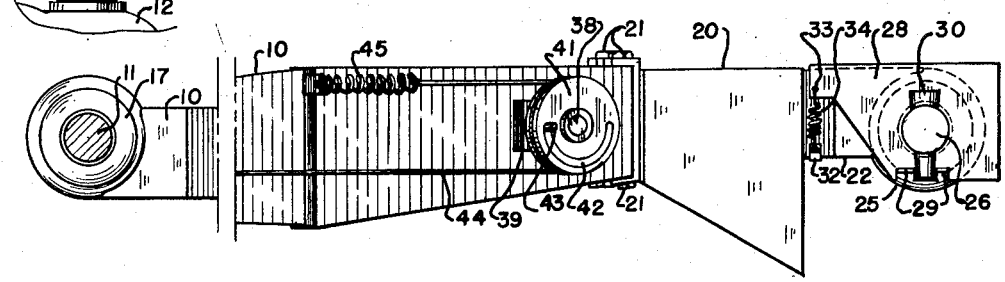
Fig. 3 is a similar fragmentary enlarged side view of the combined draw bar and coupling member of Fig. 2.

Thus, when the cables 44 are drawn upon, the sheave wheels will be rotated clockwise in Fig. 3, and when the cables 44 are released, tension springs 45, connected with the cables 44, will return the cables so as to rotate the sheave wheels counterclockwise in Fig. 3. When a sheave wheel is in the position illustrated in Fig. 3, the inclined surface of its head 37 will face the open rear of the cavity 19, and when the sheave wheel is in the full clockwise position, the inclined surface of the head 37 will face the forward extremity of the cavity 19.

Each coupling member 22 is provided with a latch socket 46 designed to receive the head 37. It can be seen that if the coupling member 22 of Fig. 7 be forced into the box 18 of Fig. 6, it will force the head 37 inwardly against the action of the spring 40 until the latch socket 46 reaches the head, at which time the head will snap into the socket and lock the coupling member in place therein.

When it is desired to release the coupling members, it is only necessary for the operator to draw upon the cables 44 so as to rotate the heads 37 180°. Now, if the tractor is driven forward, the inclined surfaces of the heads will simply climb out of the sockets 46 against the action of the springs 40. Thus, it can be seen that the implement automatically locks to the tractor and can be released therefrom by simply drawing upon the cables 44.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for coupling a towing vehicle to a towed vehicle comprising: a draw bar link extending rearwardly from the towing vehicle; a longitudinally extending socket formed in the rear extremity of said draw bar link; a coupling member mounted on the towed vehicle and positioned to enter said socket as the towing vehicle is backed toward the towed vehicle; a latch member extending through the side of said socket; spring means urging said latch member into said socket; an inclined inner extremity on said latch member, the incline normally facing rearwardly so as to cause said latch member to be forced outwardly as said coupling member enters its socket; a latch socket formed in said coupling member positioned to receive the inner extremity of said latch member when said coupling member is in place in said socket, said latch member being rotatable about its longitudinal axis so that its inclined inner extremity can be faced either toward the incoming coupler member or toward the forward extremity of said socket; and means mounted on said draw bar link for rotating said latch member to position said incline forwardly so that it may be engaged by said coupler member to force the latch member outwardly as said coupling member is withdrawn.

2. Means for coupling a towing vehicle to a towed vehicle comprising: a draw bar link extending rearwardly from the towing vehicle; a longitudinally extending socket formed in the rear extremity of said draw bar link; a coupling member mounted on the towed vehicle and positioned to enter said socket as the towing vehicle is backed toward the towed vehicle; a latch member extending through the side of said socket; spring means urging said latch member into said socket; an inclined inner extremity on said latch member, the incline normally facing rearwardly so as to cause said latch member to be forced outwardly as said coupling member enters its socket; a latch socket formed in said coupling member positioned to receive the inner extremity of said latch member when said coupling member is in place in said socket, said latch member being rotatable about its longitudinal axis so that its inclined inner extremity can be faced either toward the incoming coupler member or toward the forward extremity of said socket; a shaft extending outwardly from said latch member through the side of said cavity; a wheel mounted on said shaft; and means for rotating said wheel through an arc of 180° to position said inclined face forwardly so that it will be engaged by said coupler member to force the latch member outwardly as said coupler member is withdrawn.

3. Means for coupling a towing vehicle to a towed vehicle comprising: a draw bar link extending rearwardly from the towing vehicle; a longitudinally extending socket formed in the rear extremity of said draw bar link; a coupling member mounted on the towed vehicle and positioned to enter said socket as the towing vehicle is backed toward the towed vehicle; a latch member extending through the side of said socket; spring means urging said latch member into said socket; an inclined inner extremity on said latch member, the incline normally facing rearwardly so as to cause said latch member to be forced outwardly as said coupling member enters its socket; a latch socket formed in said coupling member positioned to receive the inner extremity of said latch member when said coupling member is in place in said socket, said latch member being rotatable about its longitudinal axis so that its inclined inner extremity can be faced either toward the incoming coupler member or toward the forward extremity of said socket; a shaft extending outwardly from said latch member through the side of said cavity; a wheel mounted on said shaft; a cable extending about said wheel and adapted to be manually moved to rotate said wheel in one direction so as to face said inclined forwardly to allow said coupling member to be withdrawn; and a spring acting on said cable to rotate said wheel in the other direction to face said incline rearwardly to receive said coupling member.

References Cited in the file of this patent

UNITED STATES PATENTS

| | | |
|---|---|---|
| 1,595,880 | Schmid | Aug. 10, 1926 |
| 1,610,902 | Tomlinson | Dec. 14, 1926 |
| 2,062,788 | Jacob | Dec. 1, 1936 |
| 2,674,169 | Sawyer | Apr. 6, 1954 |
| 2,691,932 | Sawyer | Oct. 19, 1954 |

FOREIGN PATENTS

| | | |
|---|---|---|
| 453,944 | Great Britain | Sept. 22, 1936 |